United States Patent
Price et al.

(10) Patent No.: US 7,243,690 B1
(45) Date of Patent: Jul. 17, 2007

(54) TREE GRUBBER AND PUSH BAR ATTACHMENT DEVICE

(76) Inventors: Dewayne Price, P.O. Box 53, Asher, OK (US) 74826; Gary Mock, P.O. Box 67, Asher, OK (US) 74826

( * ) Notice: Subject to any disclaimer, the term of this patent is extended or adjusted under 35 U.S.C. 154(b) by 0 days.

(21) Appl. No.: 11/354,461

(22) Filed: Feb. 15, 2006

(51) Int. Cl.
*A01G 23/08* (2006.01)

(52) U.S. Cl. ..................... 144/4.1; 144/34.1

(58) Field of Classification Search ............ 144/4.1, 144/34.1, 34.6; 59/10.1, 12.7, 14.7; 37/301
See application file for complete search history.

(56) References Cited

U.S. PATENT DOCUMENTS

| | | | |
|---|---|---|---|
| 2,506,662 | A | 5/1950 | Cusenbary |
| 4,356,644 | A | 11/1982 | Harkness |
| 5,101,873 | A | 4/1992 | Marshall |
| 5,144,993 | A | 9/1992 | Marshall |
| 5,479,971 | A | 1/1996 | Marshall |
| 5,490,340 | A | 2/1996 | Muncy |
| 5,806,605 | A * | 9/1998 | Keigley ............ 172/145 |
| 6,401,831 | B2 | 6/2002 | Bouchard |
| 6,439,279 | B1 | 8/2002 | Underwood |
| 6,763,618 | B1 * | 7/2004 | Moran ............ 37/301 |
| 6,901,978 | B2 | 6/2005 | Simpson |

OTHER PUBLICATIONS

Marshall Tree Saw Advertisement www.marshalltreesaw.com.
ABC Groff Advertisement for Marshall Tree Saw www.abcgroff.com/ic/marsh.htm.
BOBCAT (Tradmark) Advertisement www.bobcat.com/products/att/thumbnails/index.html.
Worksaver Bobcatalog 2005 Attachments, pp. 38-47.

* cited by examiner

*Primary Examiner*—Shelley M. Self
(74) *Attorney, Agent, or Firm*—Randal D. Homburg

(57) ABSTRACT

An attachment for front end loaders and for tree cutting devices attached to a front end loader provides a hydraulically extending serrated edge which may be positioned below the ground surface in front of the loader or the tree cutting device to remove small saplings and cut through roots around a tree. The attachment may also be retracted into an upright position out of the way of the front end loader, a front mounted accessory or a front mounted tree cutting device when using the accessory or tree cutting device and extended forward to push a material or a tree being cut in a direction in front of the accessory or tree cutting device and away from the front end loader.

5 Claims, 7 Drawing Sheets

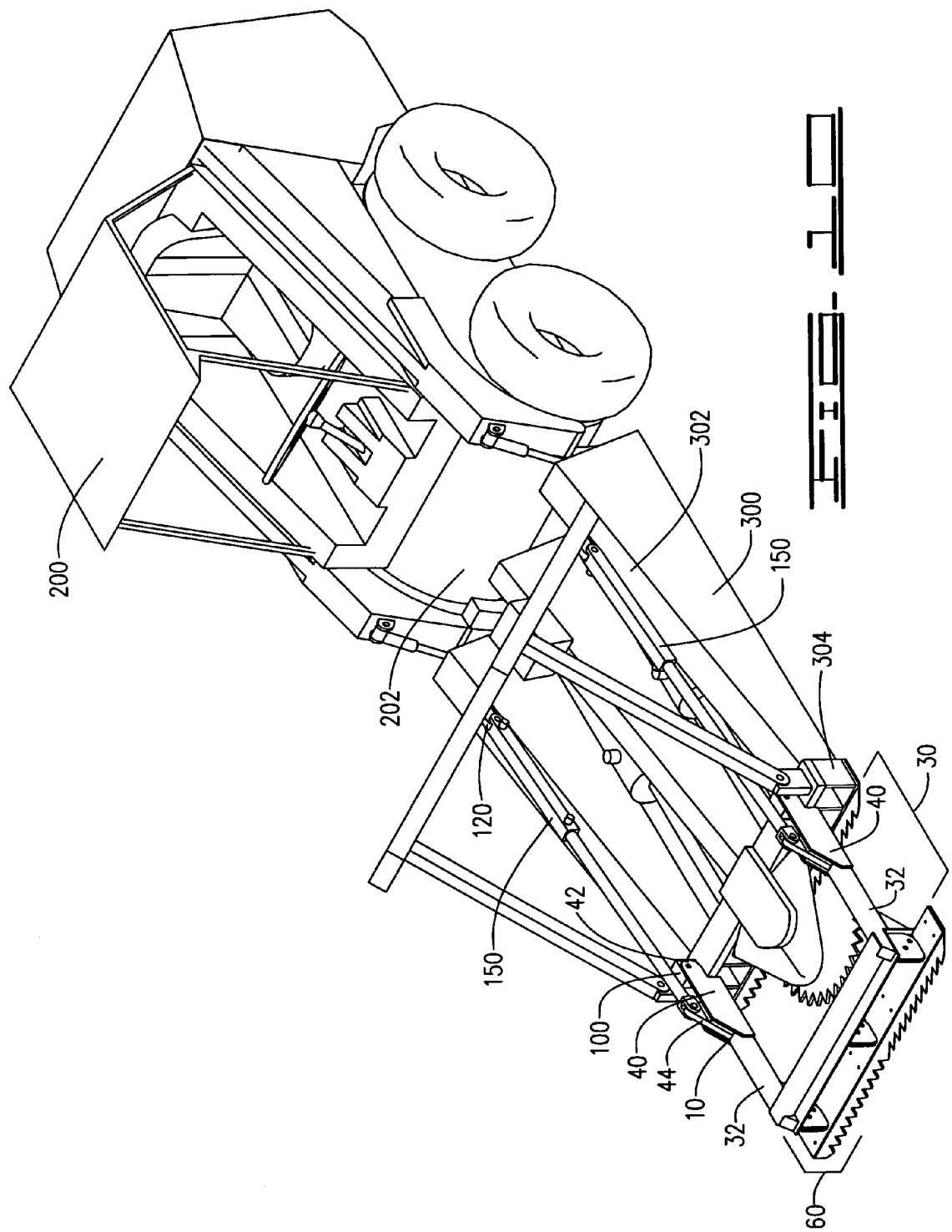

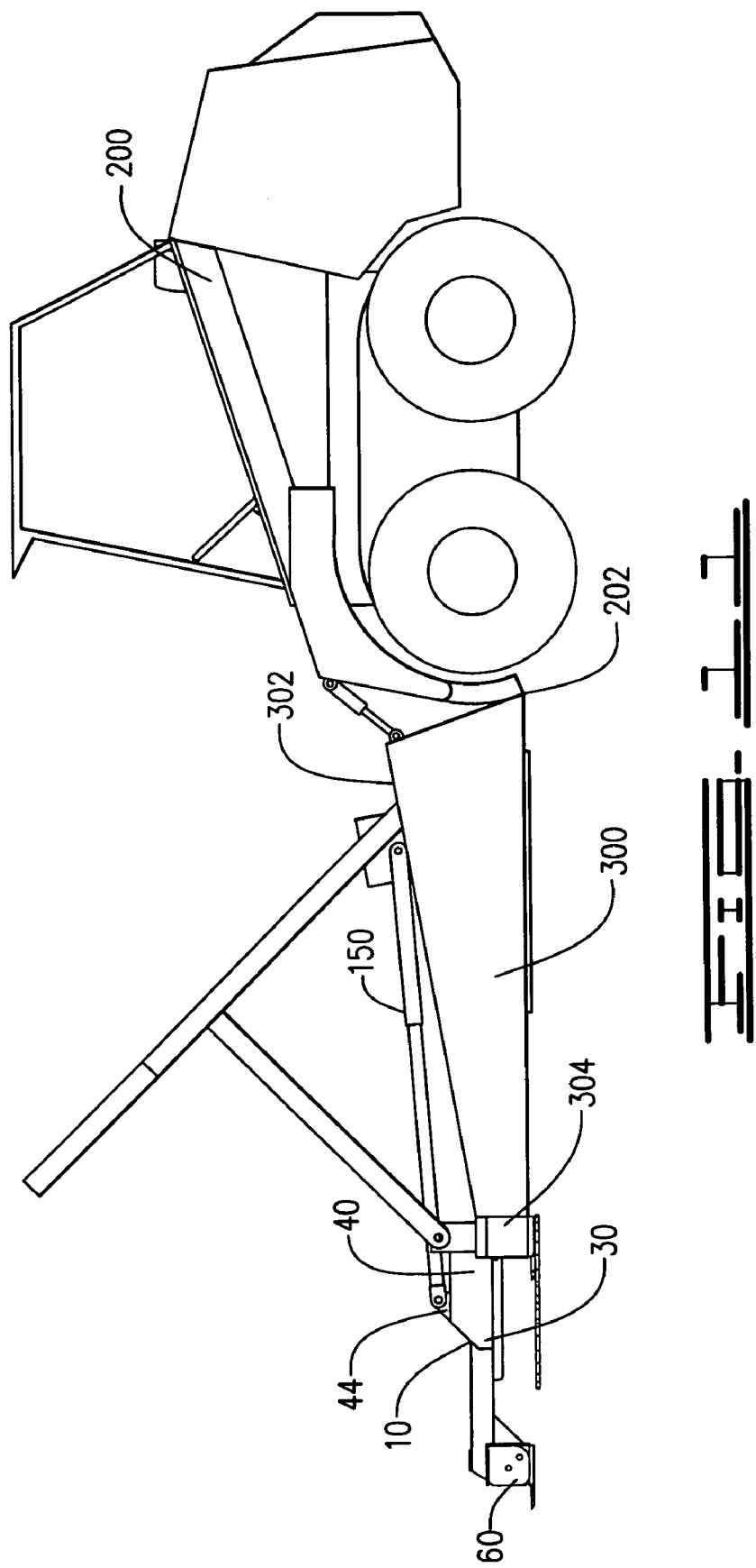

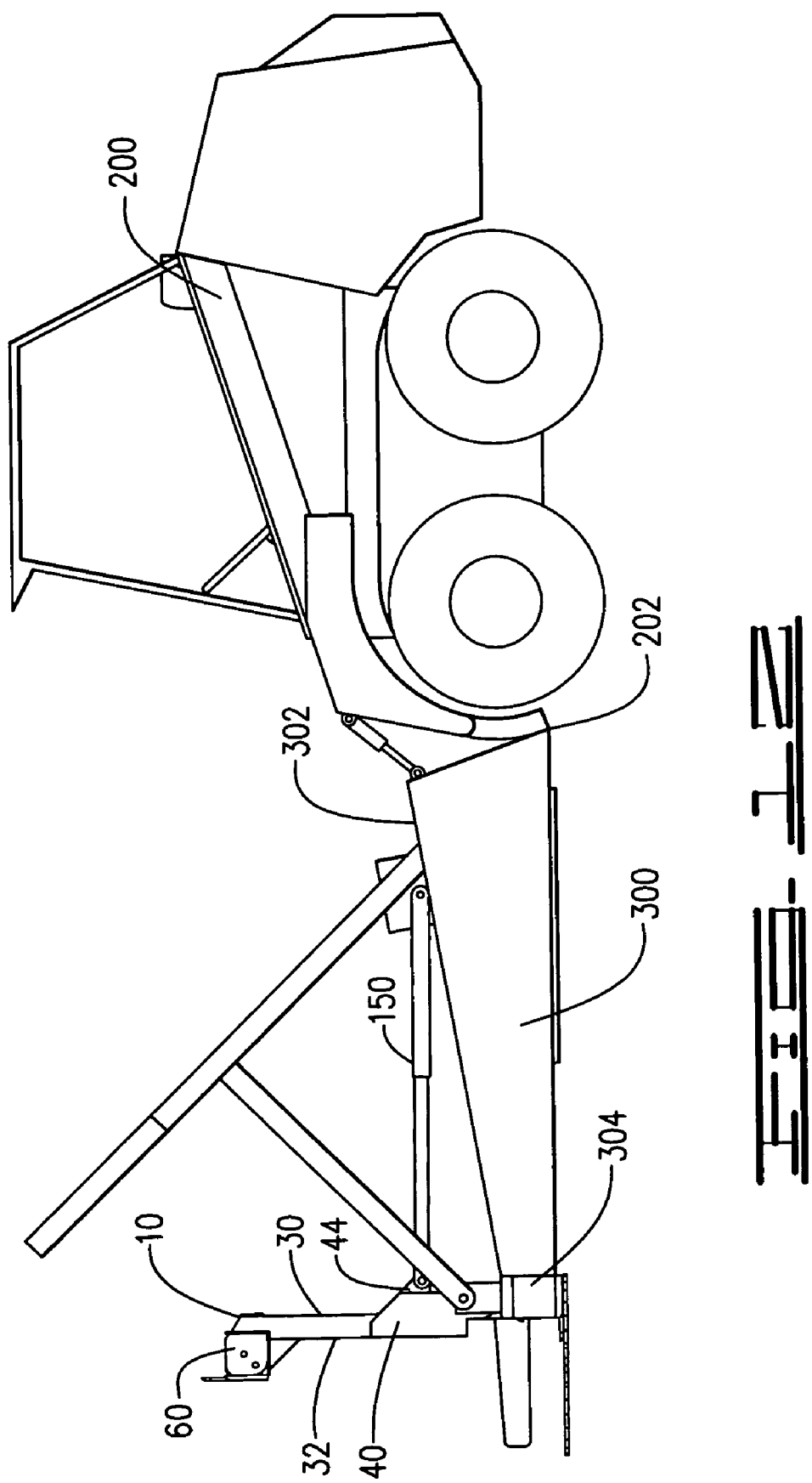

TREE GRUBBER AND PUSH BAR ATTACHMENT DEVICE

CROSS REFERENCE TO RELATED APPLICATIONS

None

BACKGROUND OF THE INVENTION

1. Field of Invention

An attachment for front end loaders and for tree cutting devices attached to a front end loader provides an extending serrated edge which may be positioned below the ground surface in front of the loader or the tree cutting device to remove small saplings and cut through roots around a tree. The attachment may also be retracted into an upright position out of the way of the front end loader, a front bucket or a front mounted tree cutting device when using the bucket or tree cutting device and hydraulically extended forward to push a tree being cut in a direction in front of the tree cutting device and away from the front end loader.

2. Description of Prior Art

The following United States patents were discovered and are disclosed within this application for utility patent. All relate to grubber attachments and tree saw devices.

Grubber has been known in the art as a term describing machine attachments adapted to tractors and other powered agricultural or industrial vehicles which are attached to the powered vehicles, either by hydraulics or a three point hitch, in front of or behind the equipment. It is utilized to cut below or at the surface of a location to remove vegetation or debris and to cut through subsurface roots. These earlier grubber devices are disclosed in the prior art below.

U.S. Pat. No. 2,506,662 to Cusenbury is a tree grubber attached to a tractor in the front of the tractor to remove trees and tree stumps, being inserted underneath the tree or stump and raised or pried from the dirt. This grubber bit has a serrated edge mounted between two support arms and is adapted to the hydraulics of the tractor, with the lifting apparatus being the supplied hydraulic connection at the bit and also the frame incorporated into the transmission of the tractor through gears and sprockets. The hydraulics apply the force to direct the bit underneath the stump, with the front end of the frame being lifted by the tractor transmission.

Adapted to a three point hitch of a tractor is the tree grubber disclosed in U.S. Pat. No. 4,356,644 to Harkness which has a front lower sharpened V-shaped blade and a rear a serrated flat edge, the serrated edge being planted in the ground to serve as a fulcrum for the front V-shaped blade, the V-shaped blade being the cutting blade for the device to lift a tree, a tree stump or a stone from the ground. A root grubber is disclosed in U.S. Pat. No. 5,490,340 to Muncy which is adapted to a boom arm of a backhoe. It includes a V-shaped cutting edge which may be applied under the ground to uproot a tree or a tree stump as attached to the backhoe.

A bareroot tree and stump extraction device is disclosed in U.S. Pat. No. 6,401,831 which utilizes a plurality of forward extending tines to either dig below the surface to uproot a tree, preferably disclosed for use in lifting bareroot trees without losing the surrounding earth on the roots of the tree. This patent is disclosed more for the mounting plate to which the tines are attached to demonstrate the back mounting plate used in the present device which is ideal for use in the present invention as the mounting plate frame 10 engaging the tool connection plate 13 of the powered vehicle to which the present grubber and push bar attachment device would employ when not adapted to a tree saw, disclosed below.

Implements associated with powered vehicle used in construction and land development intended for adaptation by the present grubber and push bar attachment device include the Marshall Tree Saw, disclosed in U.S. Pat. No. 5,479,971 to Marshall and advertised for sale at www.marshalltreesaw.com and www.abcgroff.com. Other tree saw devices to which the present device may be adated include U.S. Pat. No. 6,901,978 to Simpson, U.S. Pat. No. 6,439,279 to Underwood or U.S. Pat. Nos. 5,144,993 and 5,101,873, both to Marshall, as well as many of the attachments disclosed in the BOBCAT® advertisement found at www-.bobcat.com and pages 38 through 47 of the "WORK-SAVER BOBCATALOG 2005".

SUMMARY OF THE INVENTION

In the agricultural and construction trades, use of heavy machinery for clearing and maintaining land are frequently used to remove trees and vegetation from the land for development or maintenance of the property. In other instances, smaller front end loading equipment is used, especially in places where use of heavier equipment is prohibited or restricted. In the industry, small front end loading equipment is known in the art, some of it manufactured and sold under the BOBCAT® tradename and other major manufacturers, with a large number of attachments and accessories as previously disclose in prior art and trade magazines. Some of the attachments are adapted to the front of the front end loaders and tractors, while others are adapted to the rear of the vehicles, in either case being operated by the hydraulics of the tractor or front end loaders.

A line of tree cutting machines has been developed and has found use in conjunction with the front end loaders, particularly as tree cutting device known as the Marshall Tree Saw, manufactured by Hill Manufacturing Company. This tree saw attached to the front end loader and with the use of the hydraulic connections, cuts through relatively large diameter trees. The present device is specifically adapted for use with tree cutting devices, including the Marshall Tree Saw, although provided as a single device attachment for a front end loader, or adapted to any number of front end loader accessories and attachments.

The present device, when provided as a single attachment device, may be used in a lowered position to under cut brush and subsurface roots, and remove tree stumps and small trees, having a front serrated cutting blade which is positioned either on the ground surface or slightly below the ground surface as the front end loader is driven forward. The front serrated cutting blade may be raised during forward motion from a position above the ground all the way to a vertical position. The cutting blade may also be lowered from the vertical position to compress materials in front of the front end loader and used to scrape and level soil as the front end loader is driven forward or in reverse.

When adapted to a tree cutting device, the present device may be mounted upon the framework of the tree cutting device providing the front serrated cutting blade in front of the tree cutting device when placed in a lowered horizontal position to uproot small brush and debris in front of a tree to provide better access to the tree for cutting by the tree cutting device. The tree cutting device will sometimes allow small vegetation being removed to become lodged within the mechanical components and chains or the devices and also become bent and lodged between the cutting blade and the framework, as small saplings and small tress will bend before being cut, unlike larger trees.

The present device may also be placed in the upright vertical position and pushed forward during the tree cutting process to apply force to fall the tree in a direction in front of the front end loader to further prevent the tree from falling in the direction of the cab of the front end loader. This allows the tree cutting device to have a more versatile application and adapt the tree cutting device to remove large and small vegetation, a soil leveling feature and an additional safety feature when cutting larger trees.

The primary objective of the grubber and push bar attachment device is to provide an accessory adapted to a front end loader and connecting to the hydraulics of the front end loader to remove small trees, brush, roots and tree stumps in a lowered position, and to compress debris and materials from a raised to lowered position. A secondary objective is provide the device as a soil leveling and scraping device for a front end loader.

When adapted to a tree cutting device, the purpose of the grubber and push bar attachment device is to provide a means of removing small vegetation and debris in front of the tree cutting device for better access to the tree to be cut. Another objective of the device when adapted to a tree cutting device is to provide the blade in a vertical position as the tree is being cut to apply a forward force to the tree being cut to direct the fall of the tree away from the front end loader.

As adapted to an attachment or accessory to a front end loader other than a tree cutting device, the objective of the present grubber and push bar attachment is again to remove vegetation and brush in front of the attachment or accessory to enhance the utility of the attachment or accessory.

DESCRIPTION OF THE DRAWINGS

The following drawings are submitted with this utility patent application.

FIG. 6 is an upper perspective expanded diagram of the device components.

FIG. 10 is an upper perspective of the device attached to and adapted to an accessory implement attached to a front end loader, shown with the front portion and serrated cutting blade in a lowered and extended position.

FIG. 11 is a side view of the device attached to and adapted to an accessory implement attached to a front end loader, shown with the front portion and the serrated cutting blade in a lowered and extended position.

FIG. 12 is a side view of the device attached to and adapted to an accessory implement attached to a front end loader, shown with the front portion and the serrated cutting blade in a raised and retracted position.

DESCRIPTION OF THE PREFERRED EMBODIMENT

Figure 1:
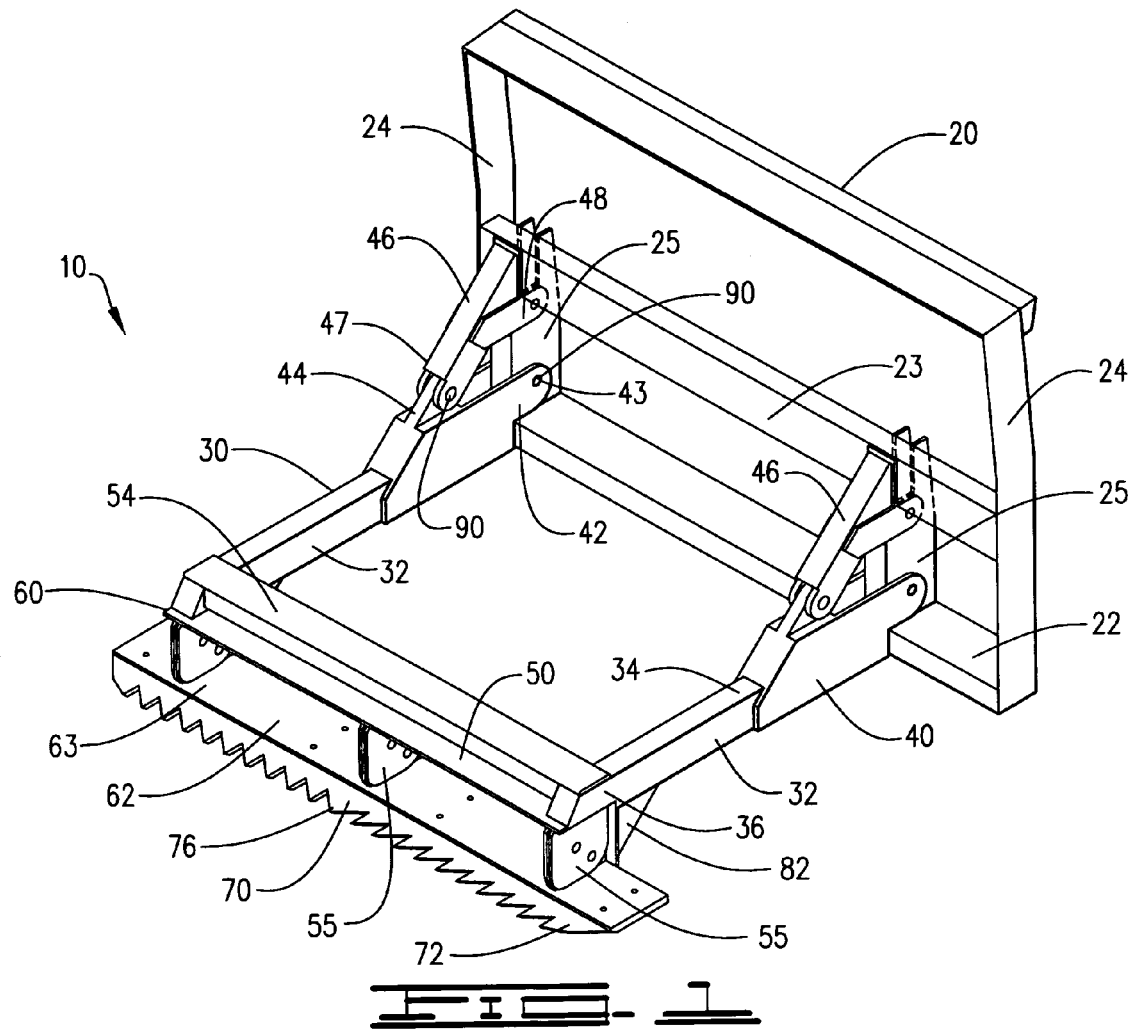
FIG. 1 is an upper perspective view of the tree grubber and push bar attachment device attached to a front-end loader mounting plate.
Figure 2:
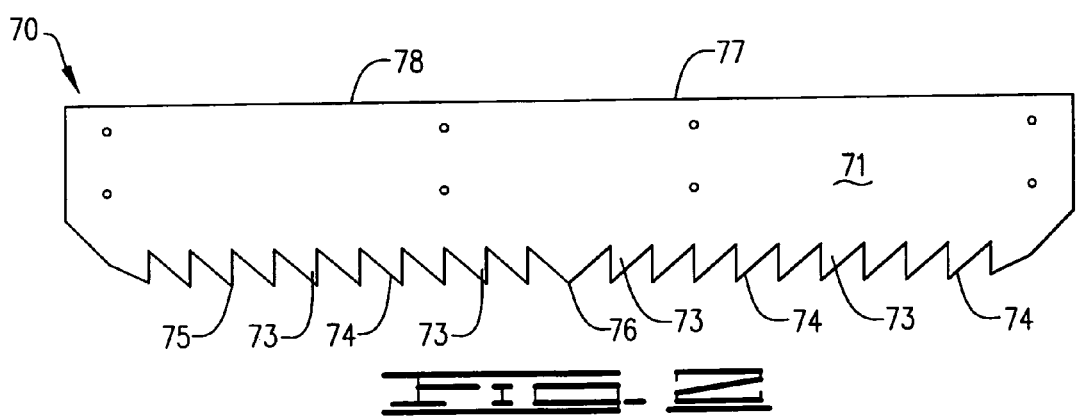
FIG. 2 is a bottom view of the serrated cutting blade.

A grubber and push bar device 10 for the removal of vegetation and subsurface roots, attaching directly to a front end 202 of a front end loader vehicle 200, FIGS. 1-6 of the drawings, the device 10 also adapted to be mounted upon an accessory 300 attached to the front end 202 of the front end loader vehicle 200, FIGS. 7-12 of the drawings.

The grubber and push bar device 10 comprises a mounting plate frame 20 adapted for removable attachment to a front end 202 of a front end loader vehicle 200, a grubber and push bar assembly 30 and a cutting blade assembly 60. The mounting plate frame 20 further comprises a lower horizontal support member 22 and at least one upper support member 23 connected between two vertical support members 24 forming a rectangle, two inner vertical mounting base members 25 attached between the lower horizontal support member 22 and the at least one upper support member 23, each inner vertical mounting base member 25 having an upper horizontal mounting bore 27 and a lower horizontal mounting bore 29.

The grubber and push bar assembly 30 further comprises two arm support members 32, each arm support member having a first end 34 attached to an arm mounting bracket 40, each arm mounting bracket 40 having a rear mounting projection 42 with a horizontal bore 43 attaching to the lower horizontal mounting bore 29 of the inner vertical mounting base member 25 with a pin 90. Each arm mounting bracket 40 further defines an upper mounting projection 44 with a horizontal bore 45 connecting to a diagonal buttress arm 46 having a lower end 47 attaching to the horizontal bore 45 of the upper mounting projection 44 by a pin 90 and an upper end 48 attaching to the upper horizontal mounting bore 27 of the inner vertical mounting base member 25 with a pin 90. Each arm support member 32 further define a second end 36, attached together on respective lower surfaces 37 by an angle body support member 50 and on respective upper surfaces 38 by an angle body stiffening member 54, the angle body support member 50 having an inner angle surface 52 to which a plurality of evenly spaced angle body hinge plates 55 are attached. Each hinge plate 55 has a rear hinge bore 57 and a front hinge bore 59, shown in FIGS. 4-6.

Figure 3:
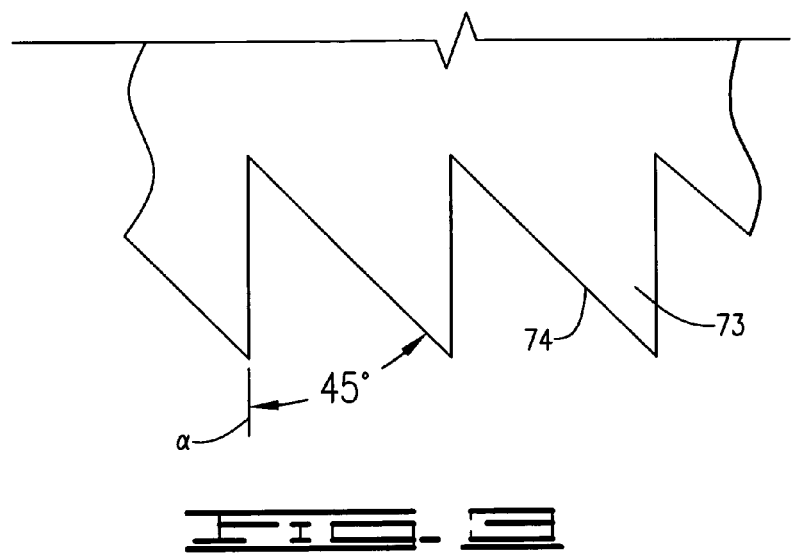
FIG. 3 is a close-up isolated view of the teeth along the serrated cutting blade.

The cutting blade assembly 60 is pivotally attached to the plurality of angle body hinge plates 55 by two pins 90 per each hinge plate 55. The cutting blade assembly 60 further comprises a blade mounting plate 62 having an upper surface 63 to which are attached a plurality of blade mounting hinge plates 65, equal in number and spacing to the number and location of the angle body hinge plates 55, each blade mounting hinge plate 65 having an upper rear mounting bore 67, a central forward mounting bore 68 and a lower rear mounting bore 69, shown in FIGS. 4-6. The blade mounting plate 62 also has a lower surface 64 to which is attached a serrated cutting blade 70, the cutting blade 70 having a lower surface 71, an upper surface 72 directed towards the lower surface 64 of the blade mounting plate 62, a plurality of cutting teeth 73, shown in FIGS. 2-3 on a forward serrated cutting margin 75, and a flat leveling margin 77 on a rear edge 78. Most preferably the plurality of cutting teeth 73 having an angled cutting edge 74 formed at a consistent 45 degree angle from a line perpendicular to the serrated cutting margin 75, as indicated in FIG. 3, with the 45 degree angles of each of the plurality of cutting teeth 73 directed to a central point 76 along the serrated cutting margin 75, FIG. 2. This would urge materials being cut along the serrated cutting margin 75 towards the center point 76 as they are being cut. The attachment of the cutting blade 70 to the blade mounting plate 62 may be either permanent or may be provided by a plurality of bolts 79, allowing the cutting blade 70 to be removed for replacement or for periodic sharpening.

Figures 4, 5:
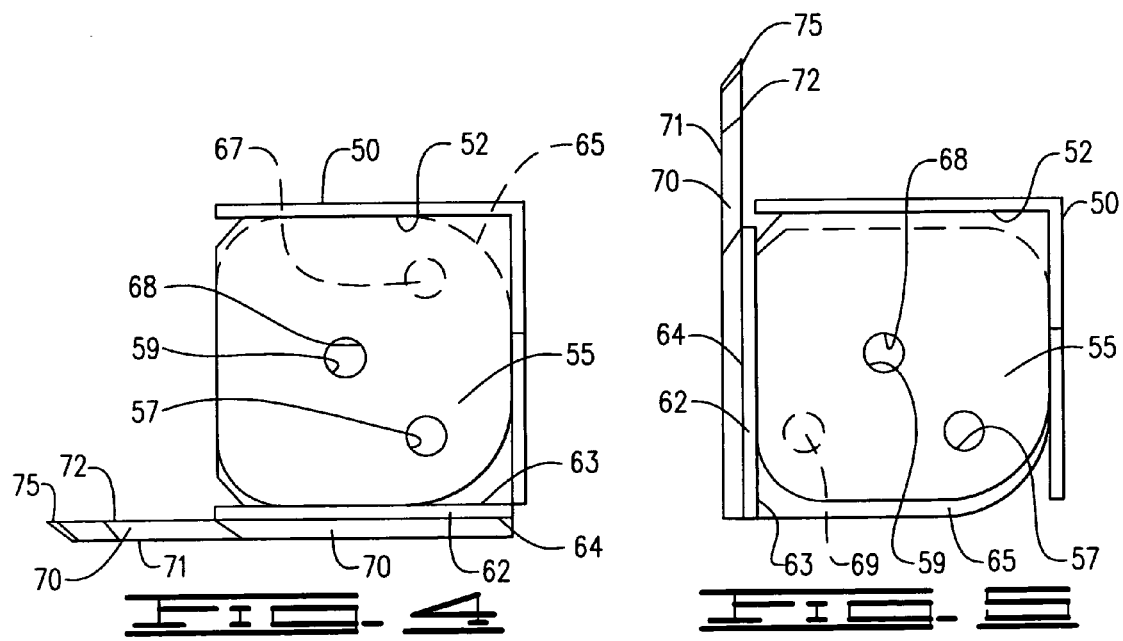
FIG. 4 is a side view of the front portion of the device with the serrated cutting blade extended in a cutting position.
FIG. 5 is the side view of the front portion of the device with the serrated cutting blade rotated in a leveling position and the posterior portion of the blade directed towards the ground under the front portion.
Figure 3:
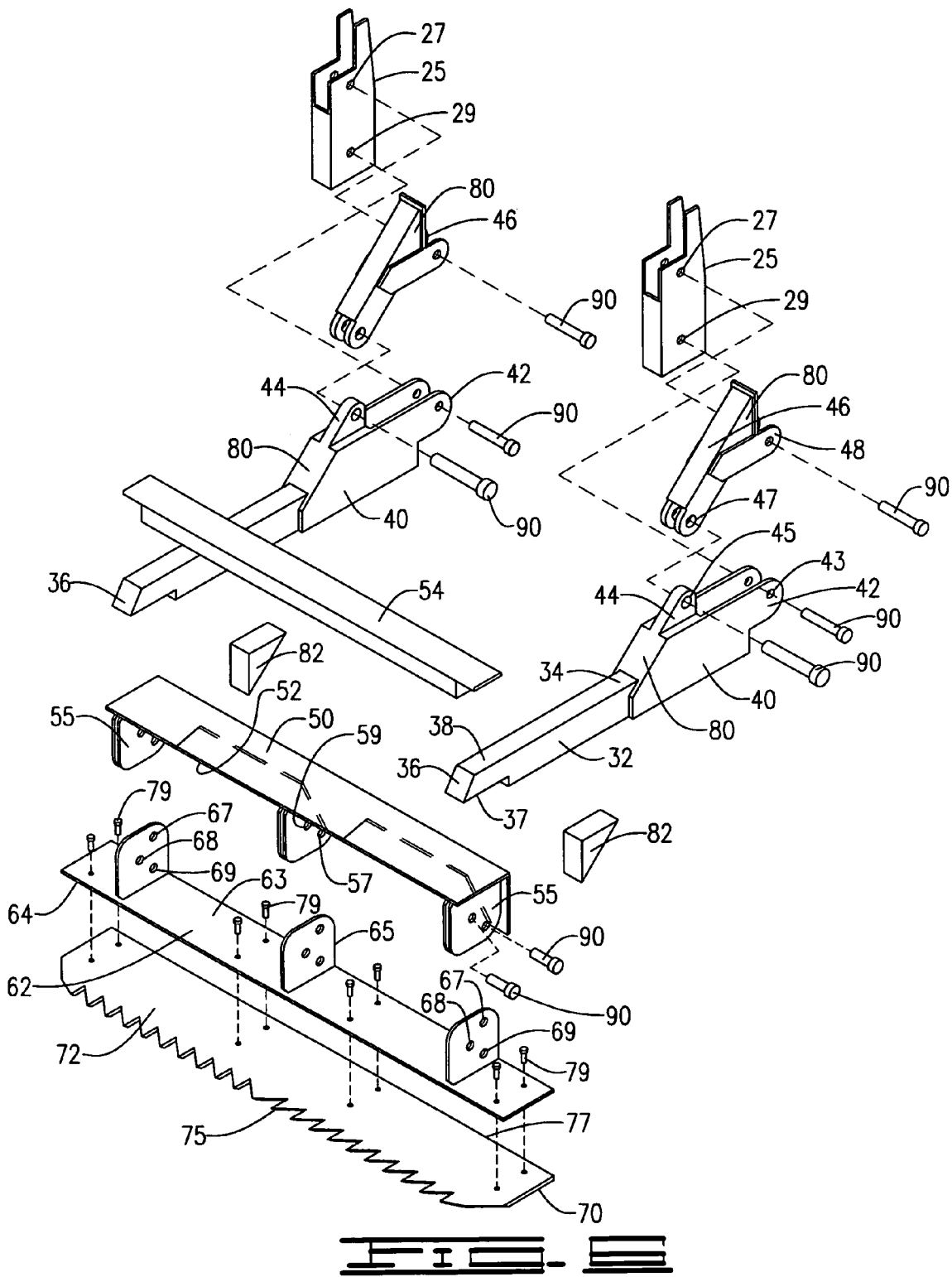
Figures 7, 8:
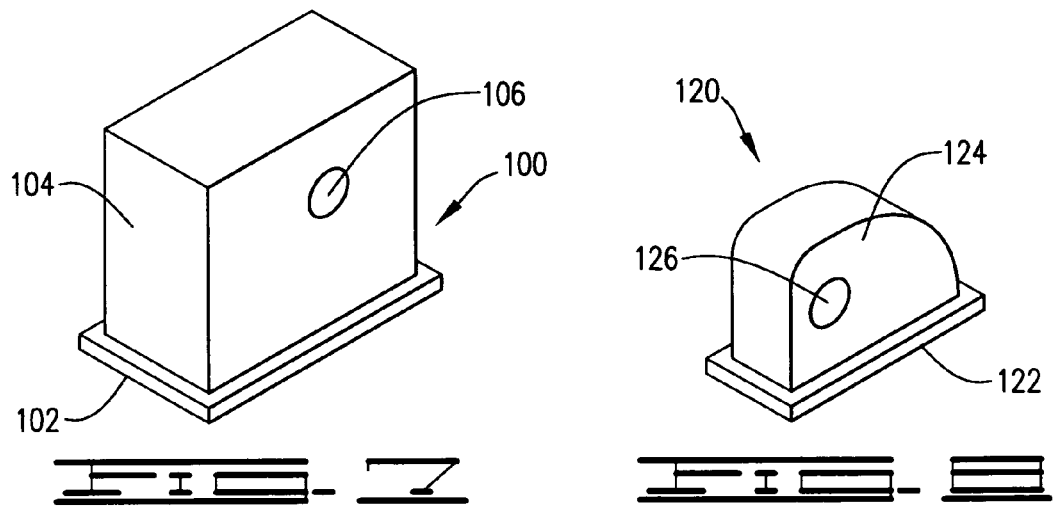
FIG. 7 is an upper perspective view of the rear adapter mounting bracket.
FIG. 8 is an upper perspective view of the front adapter mounting bracket.

The pivotal attachment of the cutting blade assembly 60 to the angle body hinge plates 55 allows the cutting blade assembly 60 to be positioned in either a cutting position, shown in FIG. 4, or a leveling position, FIG. 5. The cutting position would define the serrated cutting margin 75 positioned horizontally in front of the angle body support member 50. In this position, the two pins 90 would attach each angle body hinge plate 55 and each cooperating blade mounting hinge plate 65 by placing one pin 90 through the front hinge bore 59 of the angle body hinge plate 55 and the central forward mounting bore 68 of the blade mounting hinge plate 65 and the other pin 90 through the aligned rear hinge bore 57 of the angle body hinge plate 55 and the lower rear mounting bore 69 of the blade mounting hinge plate 65. The leveling position would define the serrated cutting margin 75 presented vertically above the angle body support member 50 and the flat level margin 77 presented below the angle body support member 50. In this position, the pin 90 connecting through the front hinge bore 59 of the angle body hinge plate 55 and the central forward mounting bore 68 of the blade mounting hinge plate 65 would remain attached and connected, but the cutting blade assembly 60 would be rotated upwards, aligning the rear hinge bore 57 of the angle body hinge plate 55 with the upper rear mounting bore 67 of the blade mounting hinge plate 65 and inserting the pin 90 once alignment is achieved, locking the cutting assembly 60 into the leveling position.

When referenced above, the pins 90 may be substituted by a bolt secured by a nut. In addition, secondary support gussets 80 may also be provided within the device 10 to further support the attachment of various components to one another, including an angle body support gusset 82 between each angle body support member 50 and each arm support member 32, FIG. 6, or located within the mounting plate frame 20 and between the arm mounting bracket 40 and the arm support member 32 (not shown).

Figure 9:
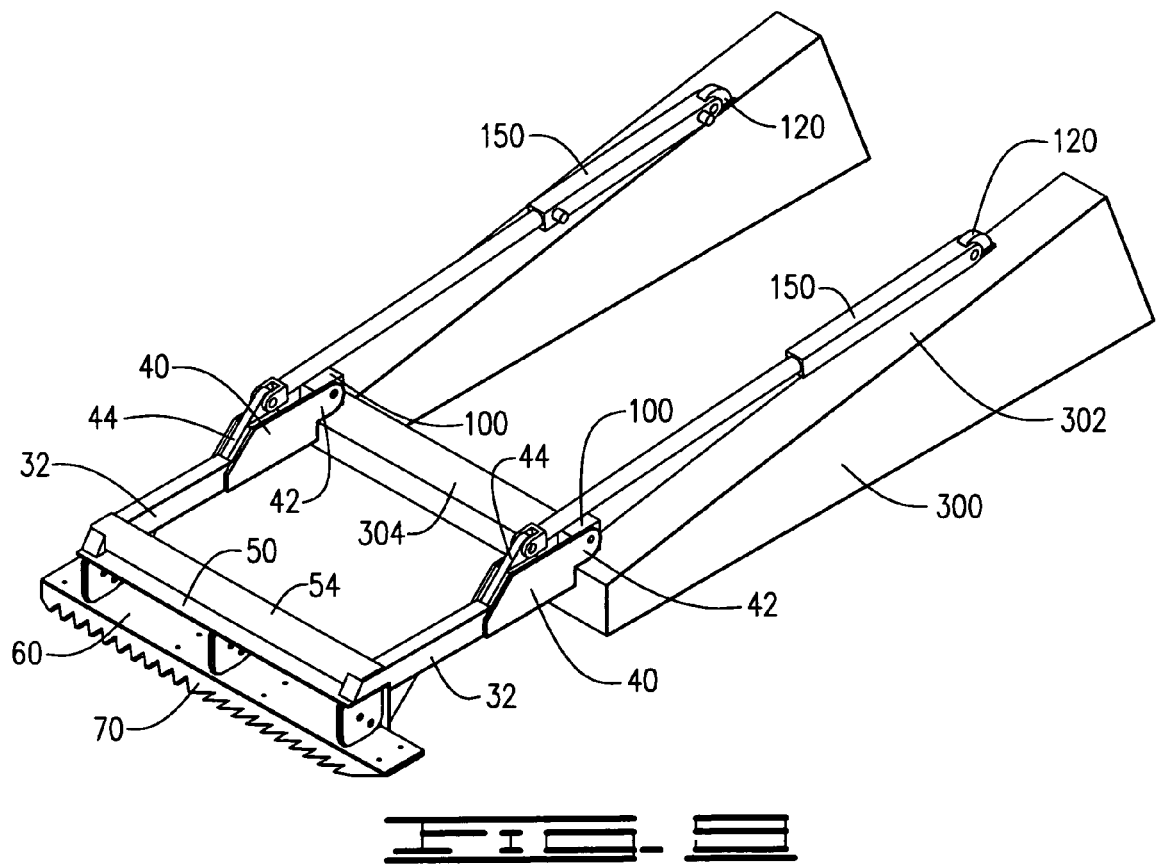
FIG. 9 is an upper perspective view of the device adapted to an accessory implement indicating the location of attachment of the device to the accessory implement.

As indicated above, the grubber and push bar device 10 may also be adapted to an accessory 300 attached to the front end 202 of the front end loader vehicle 200, shown in FIGS. 7-12 of the drawings, preferably to a tree cutting accessory 300 mounted to the front end 202 of a BOBCATS front end loader 200 as indicated in FIGS. 9-12. The grubber and push bar device 10 would be disconnected from the mounting plate frame 20 by removing the pins 90 attaching the rear mounting projection 42 of each arm mounting bracket 40 to the lower horizontal mounting bore 29 of the inner vertical mounting base 25 and removing the pins 90 attaching the upper mounting projection 44 of each arm mounting bracket 40 to the lower end 47 of the diagonal buttress arms 46. Two rear adapter mounting brackets 120, FIG. 7, having a lower base plate 122 and an upper support member 124 with a transverse bore 126 are attached to the accessory 300 along side support members 302 upon the accessory near the front end 202 front end loader 200 to which the accessory 300 is attached, as indicated in FIG. 9 of the drawings. Two front adapter mounting brackets 100, FIG. 8, having a lower base plate 102 and an upper support member 104 with a transverse bore 106 are attached to the accessory 300 upon a front portion 304 of the accessory 300, as shown in FIG. 9.

Respective hydraulic cylinders 150 are connected between each transverse bore 126 of each rear adapter mounting bracket 120 and the horizontal bore 45 of each upper mounting projection 44 of each arm mounting bracket 40 by pins 90, while each horizontal bore 43 of each rear mounting projection 42 of each arm mounting bracket 40 is attached to each transverse bore 106 of each front adapter mounting bracket 100 by pins 90. The hydraulic cylinders 150 are connected to the hydraulic system of the accessory and front end loader, not shown, or attached to a hydraulic diversion valve, also not shown, to select between operation of the grubber and push bar device 10 to raise and lower the adapted device 10 when attached to the accessory 300, or to operate the accessory 300.

Once the grubber and push bar device 10 is attached to the accessory 300, as indicated in FIGS. 9-12, the cutting blade assembly 60 and the attached arm support members 32 may be placed in a lowered and extended position in front of the accessory 300, shown in FIGS. 9-11, which would be the position used to uproot small vegetation and cut through sub-surface roots, the cutting blade assembly 60 and arm support members 32 being raised during use to uproot and extract the vegetation and sub-surface roots. The raised and retracted position, shown in FIG. 12, would be preferred when operation of the preferred tree cutting accessory 300 only is chosen by the operator, with the cutting blade assembly 60, positioned out of the way of the tree cutting accessory 300, or positioned for use during operation of the tree cutting accessory 300 as a push bar, applying an extending forward hydraulic extending force to the cutting blade assembly 60 against the trunk of a tree being cut by a tree cutting accessory 300 to push the tree forward as it is being cut. The device 10 may also be utilized to lower and extend the cutting blade assembly 60 to compress vegetation and bend it out of the way so that better access may be gained by the accessory 300 to which the device 10 is attached.

While the invention has been particularly shown and described with reference to a preferred embodiment thereof, it will be understood by those skilled in the art that changes in form and detail may be made therein without departing from the spirit and scope of the invention.

What is claimed is:

1. A grubber and push bar device for the removal of vegetation and subsurface roots, attaching to a front end of a front end loader vehicle, comprising:
   a mounting plate frame adapted to be removably attached to said front end of said front end loader vehicle, said mounting plate frame defining a lower horizontal support member and at least one upper support member connected between two vertical support members, and two inner vertical mounting base members attached between said lower horizontal support member and said at least one upper support member;
   a grubber and push bar assembly having two arm support members, each said arm support member having a first end attached to an arm mounting bracket, each arm mounting bracket having a rear mounting projection removably attached to each said inner vertical mounting base member, and each arm mounting bracket further having an upper mounting projection removably attached to a lower end of a diagonal buttress arm, each said diagonal buttress arm also defining an upper end removably attaching to said inner vertical mounting base member, each said arm support member having a second end, said second ends of said two arm support members attached together on respective lower surfaces by an angle body support member and on respective upper surfaces by an angle body stiffening member, said angle body support member having an inner angle surface to which a plurality of evenly spaced angle body hinge plates are attached; and a cutting blade assembly pivotally attached to said grubber and push bar assembly, said cutting blade assembly further comprising a blade mounting plate having an upper surface to which are attached a plurality of blade mounting hinge plates, equal in number and spacing to said plurality of angle body hinge plates, each said blade mounting hinge plate pivotally attaching to each said angle body hinge plate by removable pins, said blade mounting plate further defining a lower surface to which is attached a serrated cutting blade having a plurality of cutting teeth on a serrated cutting margin.

2. The grubber and push bar device as disclosed in claim 1, further comprising:

each said inner vertical mounting base member has an upper horizontal mounting bore and a lower horizontal mounting bore; and each said arm mounting bracket defines a rear mounting projection with a horizontal bore and an upper mounting projection with a horizontal bore, each said rear mounting projection removably connected to said lower horizontal mounting bore of each said inner vertical mounting base by a pin and each said upper mounting projection connected to a horizontal bore of a lower end of each said diagonal buttress arm by a pin and an upper end of each said diagonal buttress arm connected to said upper horizontal mounting bore of said inner vertical mounting base by a pin.

3. The grubber and push bar device as disclosed in claim 1, said cutting blade assembly further comprising:

said blade mounting plate having a lower surface to which said serrated cutting blade is attached, said serrated cutting blade defining a lower surface, an upper surface directed towards said lower surface of said blade mounting plate, a plurality of cutting teeth having an angled cutting edge, said plurality of cutting teeth defining said serrated cutting margin, with said plurality of cutting teeth directed to a central point along said serrated cutting margin.

4. The grubber and push bar device as disclosed in claim 1, further comprising:

each said angle body hinge plate defines a rear hinge bore and a front hinge bore; and each said blade mounting hinge plate defines an upper rear mounting bore, a central forward mounting bore and a lower rear mounting bore, wherein said pivotal attachment of said cutting blade assembly to said grubber and push bar assembly provides said cutting blade assembly in a cutting position and a leveling position, said cutting position having said serrated cutting margin in a horizontal placement, wherein a pin is inserted through each aligned said front hinge bore of each said angle body hinge plate and said central forward mounting bore of said blade mounting hinge plate and another pin is inserted through each aligned said rear hinge bore of each said angle body hinge plate and said lower rear mounting bore of said blade mounting hinge plate, and said leveling position having said serrated cutting margin in a vertical placement, wherein a pin is inserted through each aligned said front hinge bore of each said angle body hinge plate and said central forward mounting bore of said blade mounting hinge plate and another pin is inserted through each aligned said rear hinge bore of each said angle body hinge plate and said upper rear mounting bore of said blade mounting hinge plate.

5. The grubber and push bar device as disclosed in claim 1, further comprising:

each said inner vertical mounting base member has an upper horizontal mounting bore and a lower horizontal mounting bore, and each said arm mounting bracket defines a rear mounting projection with a horizontal bore and an upper mounting projection with a horizontal bore, each said rear mounting projection removably connected to said lower horizontal mounting bore of each said inner vertical mounting base by a pin and each said upper mounting projection connected to a horizontal bore of a lower end of each said diagonal buttress arm by a pin and an upper end of each said diagonal buttress arm connected to said upper horizontal mounting bore of said inner vertical mounting base by a pin;

said blade mounting plate having a lower surface to which said serrated cutting blade is attached, said serrated cutting blade defining a lower surface, an upper surface directed towards said lower surface of said blade mounting plate, a plurality of cutting teeth having an angled cutting edge, said plurality of cutting teeth defining said serrated cutting margin, with said plurality of cutting teeth directed to a central point along said serrated cutting margin; and each said angle body hinge plate defines a rear hinge bore and a front hinge bore and each said blade mounting hinge plate defines an upper rear mounting bore, a central forward mounting bore and a lower rear mounting bore, wherein said pivotal attachment of said cutting blade assembly to said grubber and push bar assembly provides said cutting blade assembly in a cutting position and a leveling position, said cutting position having said serrated cutting margin in a horizontal placement, wherein a pin is inserted through each aligned said front hinge bore of each said angle body hinge plate and said central forward mounting bore of said blade mounting hinge plate and another pin is inserted through each aligned said rear hinge bore of each said angle body hinge plate and said lower rear mounting bore of said blade mounting hinge plate, and said leveling position having said serrated cutting margin in a vertical placement, wherein a pin is inserted through each aligned said front hinge bore of each said angle body hinge plate and said central forward mounting bore of said blade mounting hinge plate and another pin is inserted through each aligned said rear hinge bore of each said angle body hinge plate and said upper rear mounting bore of said blade mounting hinge plate.

* * * * *